United States Patent [19]

Streib

[11] Patent Number: 4,495,488
[45] Date of Patent: * Jan. 22, 1985

[54] ULTRASENSITIVE APPARATUS AND POSITIONING METHOD FOR DETECTING CHANGE IN FLUID FLOW CONDITIONS IN RELIEF FLOWLINES ASSOCIATED WITH A CHEMICAL OR REFINERY COMPLEX

[75] Inventor: Stephen F. Streib, Novato, Calif.

[73] Assignee: Chevron Research Company, San Francisco, Calif.

[*] Notice: The portion of the term of this patent subsequent to Feb. 28, 2001 has been disclaimed.

[21] Appl. No.: 409,379

[22] Filed: Aug. 18, 1982

Related U.S. Application Data

[63] Continuation-in-part of Ser. No. 184,560, Sep. 5, 1980, Pat. No. 4,434,418.

[51] Int. Cl.$^3$ ............................................. G08B 21/00
[52] U.S. Cl. .................................... 340/606; 340/517; 73/195; 73/204
[58] Field of Search ...................... 340/606, 518, 517; 73/204, 195; 374/29, 30

[56] References Cited

U.S. PATENT DOCUMENTS

| | | | |
|---|---|---|---|
| 2,729,976 | 1/1956 | Lawb | 73/204 |
| 2,808,580 | 10/1957 | Fuller | 340/606 |
| 3,431,149 | 3/1969 | Webb | 374/29 X |
| 3,821,895 | 7/1974 | Sumikawa et al. | 374/30 |
| 4,102,196 | 7/1978 | Holtermann | 374/30 X |
| 4,198,859 | 4/1980 | Holtermann | 374/30 |

FOREIGN PATENT DOCUMENTS

| | | | |
|---|---|---|---|
| 44368 | 12/1934 | France | 73/204 |
| 587996 | 5/1947 | United Kingdom | 374/29 |

Primary Examiner—James L. Rowland
Assistant Examiner—Daniel Myer
Attorney, Agent, or Firm—H. D. Messner; Edward J. Keeling

[57] ABSTRACT

Transient change in heat flux due to ultrasmall variation in flow conditions (say from no-flow to flow) within a series of relief flowlines to pinpoint sources of plant upset, is achieved by carefully positioning (in each flowline closely adjacent to an associated relief valve) a transducer-meter for sensing transient heat flux from a selected location completely exterior of the line; and recording in sequence: (i) a base line signal indicative of a no-flow, steady state condition at each selected location along the flowline, and (ii) a transient signal indicative of a flow condition. Both types of signals are generated by a plurality of thermocouples (a thermopile) attached to each flowline in a heat flux sensing relationship that takes into account the type of fluid being monitored and the temperature gradient existing across the relief valve. Recordation of the sensed signals is via a recorder, although use of a signaling circuit to immediately alert an operator of a change in flow condition is contemplated.

7 Claims, 7 Drawing Figures

ULTRASENSITIVE APPARATUS AND POSITIONING METHOD FOR DETECTING CHANGE IN FLUID FLOW CONDITIONS IN RELIEF FLOWLINES ASSOCIATED WITH A CHEMICAL OR REFINERY COMPLEX

CROSS REFERENCE TO RELATED APPLICATION

This is a continuation-in-part application of Ser. No. 184,560, filed Sept. 5, 1980, for "Ultrasensitive Apparatus And Method For Detecting Change In Fluid Flow Conditions In Relief Flowlines Associated With A Chemical Or Refinery Complex", now U.S. Pat. No. 4,434,418, issued Feb. 28, 1984.

SCOPE OF THE INVENTION

This invention relates to the monitoring of an ultrasensitive apparatus for sensing small changes in heat flux due to corresponding low flows of fluid within a body under varying conditions, especially a transient condition in which such fluid flow unexpectedly occurs. The invention has particular application in indicating the unexpected occurrence of fluid flow within a relief flowline or series of such lines, in a chemical or refinery complex.

RELATED APPLICATIONS

My following applications, filed simultaneously herewith, are incorporated by reference:

(i) "Improved Ultrasensitive Apparatus And Recording Method For Detecting Change In Fluid Flow," Ser. No. 409,378, now abandoned; and (ii) "Improved Ultrasensitive Apparatus and Monitoring Method For Detecting Change In Fluid Flow Conditions In Relief Flowlines Associated With A Chemical Or Refinery Complex," Ser. No. 409,380, now abandoned; and (iii) Improved Ultrasensitive Apparatus and Monitoring Method for Detecting Change in Fluid Flow, Ser. No. 409,377.

In addition, my applications filed previously are also incorporated herein by reference:

(i) "Ultrasensitive Apparatus and Method For Detecting Change In Fluid Flow, Especially During The Occurrence Of A Transient Condition", Ser. No. 184,559, filed Sept. 5, 1980, now U.S. Pat. No. 4,433,329, issued Feb. 21, 1984; and (ii) "Ultrasensitive Apparatus and Method For Detecting Change In Fluid Flow Conditions In A Flowline Of A Producing Oil Well, Or The Like", Ser. No. 184,558, filed Sept. 5, 1980.

BACKGROUND OF THE INVENTION

The art of detection of fluid flow is replete with several classifications of inventions indexed for different purposes, say based on type of use involved versus their principles of operation. I am unaware of any detector or method which has cascaded the output effect to detect an ultrasmall change in transient flow conditions under a variety of occurrences, especially say from a heat sensing position completely exterior of the fluid-carrying body while maintaining the integrity of the interior of the body intact, i.e., without providing openings through the body itself.

In my previously filed applications of record, the transducer-meters of those disclosures are positioned completely exterior of the relief line (or series of relief lines) to be monitored (i.e., the relief line is not penetrated by openings). Monitoring variations in fluid flow is based on the assumption that the total system operations can be described with reference to two sequentially occurring temperature conditions: (i) a steady state temperature condition in which the relief line carrying the fluid and the air surrounding the meter are at the same temperature; and (ii) a transient condition in which change in fluid flow, say from a no-flow to a flow condition as a control valve opens, provides a mass of fluid adjacent the meter at a temperature that differs sufficiently from that of the surrounding air to cause the generation of a transient heat flux detectable by the meter.

SUMMARY OF THE INVENTION

In accordance with the present invention, transient change in heat flux due to a small variation in flow conditions (say from no-flow to flow) within a relief line or series of relief flowlines, is surprisingly useful in pinpointing a source (or sources) of plant upset. In monitoring the relief lines, diagnostic operations are aided by locating each meter substantially adjacent to the relief valve controlling the flow of fluid in each relief line, say downstream beyond a vertical plane through the flanged joint of the relief valve and flowline. Result: Corrective actions can be efficiently undertaken, as required.

In accordance with the invention, each meter is preferably located a distance $Z'$ from the axis of symmetry of each relief valve whereby in the no-flow condition, a steady state ambient temperature state exists at the meter, but in the subsequently occurring flow condition, a transient detection state becomes established. In that way, the resulting change in signal level associated with a flow condition is more easily identified since the detected flux level is specifically related to the transient thermal detection mode only. Relative change is also more easily ascertainable for the same reason.

Visual and/or audio signals can also be generated as events of interest occur in real time to alert the operator, irrespective of the fact that the operator's attention may be focused in another direction or on other duties. Performance is further enhanced by attaching the transducer-meter of the present invention to the relief line via a heat conducting adhesive. Result: a further reduction in background signal level.

DESCRIPTION OF AN EMBODIMENT OF THE INVENTION

Figure 1:
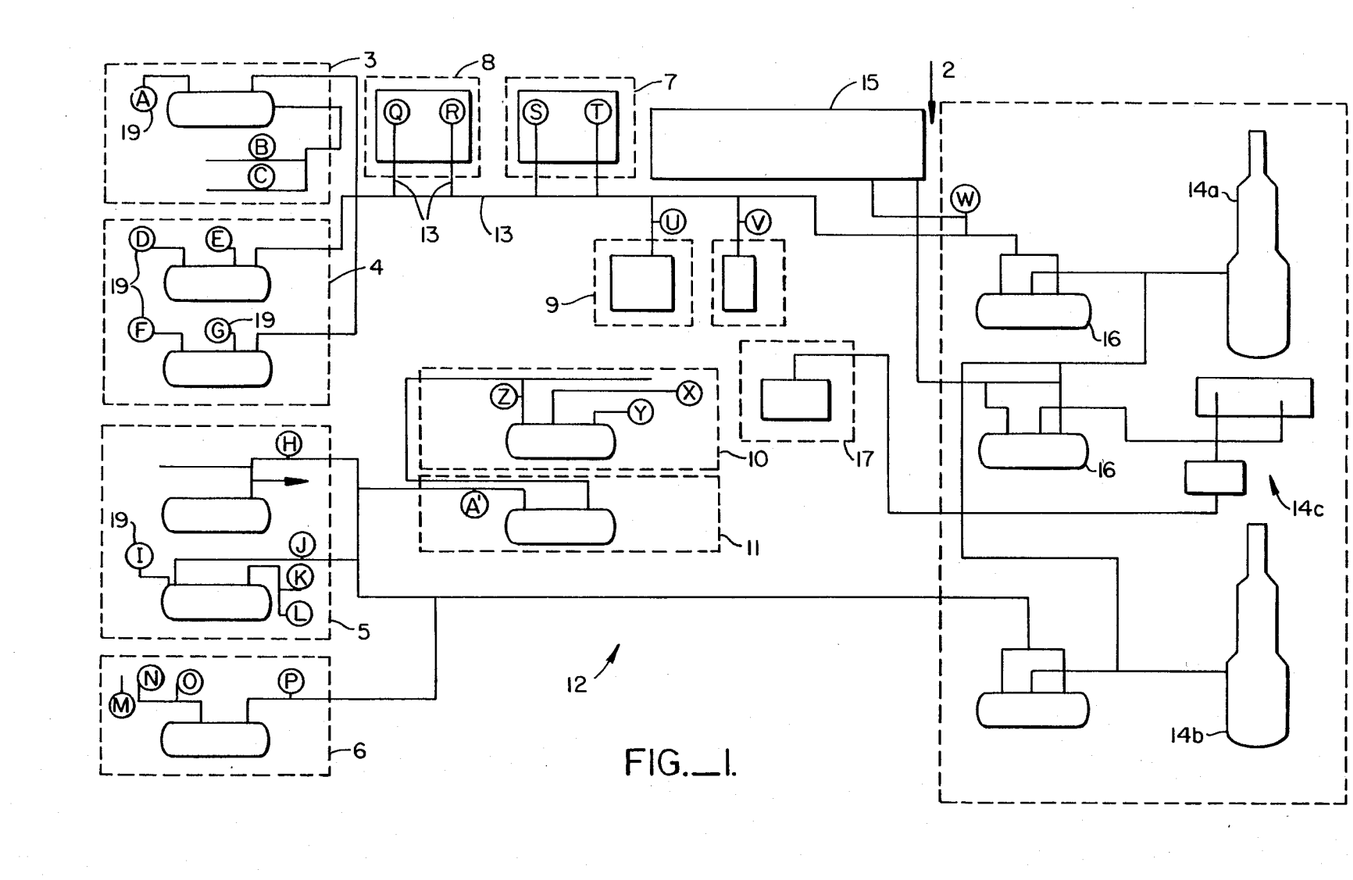
FIG. 1 is a schematic diagram of a series of relief flowlines forming a component part of a relief-flare system associated with a refinery or chemical complex, in which a plurality of heat flux transducer-meters are located at particular points within the relief-flare system in order to pinpoint a source (or sources) of upset.

Reference should now be had to FIG. 1 illustrating the present invention in a particular useful environment, viz., in monitoring fluid flow conditions within relief-flare system 2 associated with process units 3–11 of refinery complex 12. By monitoring the downstream side of a series of flowlines 13 comprising a component part of relief-flare system 2, as described hereinafter, an operator (or operators) can promptly pinpoint any source (or sources) of plant upset within the refinery complex 12, and initiate corrective action as necessary.

Of course, the refinery complex 12 is theoretically designed to remain in dynamic balance during all operations. Flow rates of feedstock and refinery products for example, can be stabilized vis-a-vis various processing-treatment operations associated with units 3–11. Result: Feedstock-product balance within each unit 3–11 can usually be easily maintained within acceptable limits, such as at hexane unit 2, crude units 4, catalytic cracking unit 5, catalytic reformers 6 and 7, hydrocracking unit 8, hydrogen plant 9, alkylation unit 10, and pretreatment unit 11.

Momentary upsets do occur however. Varying amounts of "upset" product fluids can be generated at the various units on both a periodic and aperiodic basis. These fluids (both in gas or liquid phase, or both) are purged from system 12 via the relief-flare system 2. Pressure is the control variable monitored. When one or more of the units 3–11, for example, become unbalanced, increases in pressure within the relief-flare system 2 are used to successfully initiate relief-flaring operations. But it remains for an operator to pinpoint the source (or sources) of the unbalanced operations within the complex 12. That is to say, an operator must determine where the upset has occurred and then initiate corrective action, as required. (Prolonged flaring and/or attendant odor problems caused by plant upsets waste energy and can bring the refining operation into violation of Federal and State pollution laws.)

In accordance with the present invention, relief-flare system 2 [which includes (i) a series of relief flowlines 13 previously mentioned connected to various process units 3–11 as well as to (ii) flare units 14a–14c, (iii) compressor network 15, (iv) knock-out drums 16, and (v) storage network 17] is augmented by a series of relief flow transducer-meters generally indicated at 19 located at strategic positions within the relief-flare system 2 say at positions A, B, . . . A' of FIG. 1. Result: Unbalanced units within the refining complex 12 can be easily identified and correction action quickly undertaken, as needed.

However, before discussing operations of the transducer-meters 19 of the relief-flare system 2 in detail, perhaps a closer look at the operations of refinery complex 12 is in order.

First, it should be evident from inspection that FIG. 1 is not a typical feedstock-product flow diagram, but instead focuses on relief operations of the units 3–11. Hence, only a generalized discussion of the individual processing operations of the units 3–11 seems necessary to wit:

After the crude oil feedstock has been degassed, dewatered, and heated, operations can be initiated at crude units 4 after entry of the feedstock. After completion of the distillation process at units 4, further refining (of the products and residuum oil of distillation) can occur, say at catalytic cracking unit 5 and/or hydrocracking unit 8. At units 5 and 8, molecules of the introduced fluids are reduced in size and/or provided with additional hydrogen to increase, inter alia, yield. Catalytic reformer units 6 and 7 improve produce quality as by improving octane number; alkylation unit 10 in combination with pretreatment unit 11 (to protect its catalyst) provides additional processing steps such as to change the lower molecular weight hydrocarbons into higher molecular weight hydrocarbons. Thus for example, units 10 and 11 can be used to change olefins into isoparaffins. Hexane unit 3 and hydrogen plant 9 are associated units of the refining process adding feedstock and/or catalytic by-product capacity to various process units as required. The hexane product, for example, can be used in the blending of aviation gasoline, while the hydrogen from plant 9 is used in various process capacities, as required.

Operation Of The Transducer-Meter 19

Figure 2:
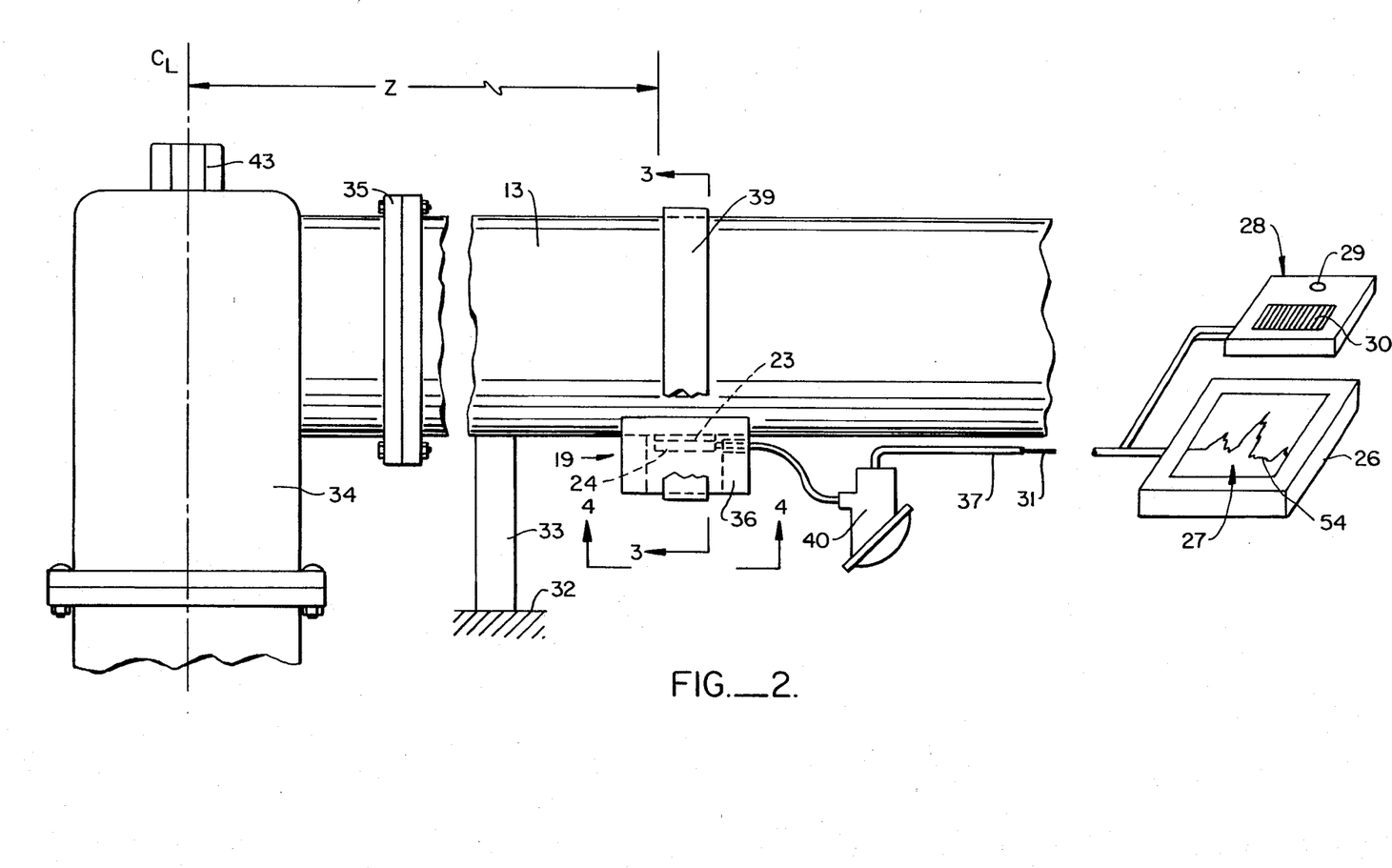
FIG. 2 is a side elevational view of one of the relief flowlines of FIG. 1 illustrating attachment and operation of an individual heat flux indicating transducer-meter in accordance with the present invention.
Figure 3:
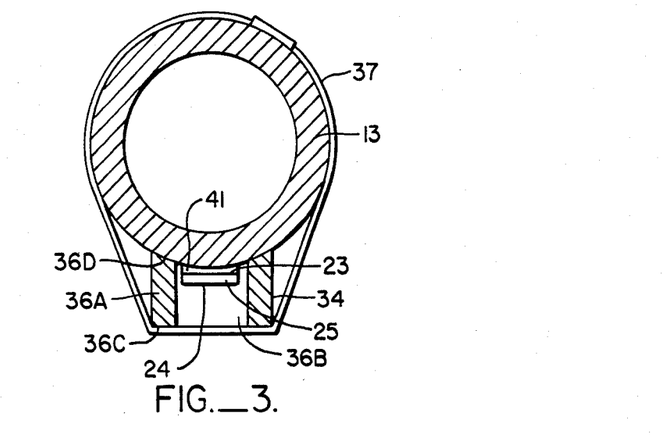
FIG. 3 is a sectional view taken along line 3—3 of FIG. 3.
Figure 4:
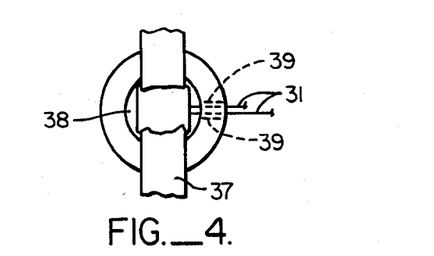
FIG. 4 is a detailed view of the transducer-meter of the present invention taken in the direction of line 4—4 of FIG. 2.

Operation of each of the flux transducer-meter 19 in the present invention is shown in FIGS. 2, 3 and 4 and in general is a somewhat conventional application of thermopile principles in which a temperature difference (delta-T) between thin metallic layers or plates 23 and 24 connecting to a plurality of N thermocouples etched on insulating board 25, see FIG. 3, causes the combination to generate a potential signal proportional to delta-T at recorder 26. That is to say, both plates 23 and 24 and the plurality of N thermocouples form elements of the aforementioned thermopile circuit by which the signal outputs are cascaded as the latter appear at recorder 26. Result: A surprisingly sensitive millivolt output is produced proportional to the heat flux passing through the transducer-meter 19 as a direct function of change in fluid flow within the relief line 13 (either in gas or liquid phase, or both). (In this regard, N is preferably about 80 but can be equal to 320, if desired.) At the recorder 26, the output of each meter 19 in both transient and nontransient operating states can be accurately displayed via graph 27 relative to a calibrated threshold level using a servo operated voltage balancing circuit in conjunction with a null-balancing circuit so as to surprisingly indicate heat flow within the flow-carrying body under survey, as a function of time.

Also in electrical circuit with meter 19 is signaling circuit 28 for generating visual and/or audio signals to alert an operator of the occurrence of changes in fluid flow. In this regard, signaling circuit 28 can be activated to indicate the occurrences of such transient fluid flow via activation of lamp indicator 29 and/or of audio indicator 30, or both. Circuit 28 can include a servo operated balancing circuit in operative contact with a null-balancing circuit. Control signals are easily generated so as to drive the lamp indicator 29 and/or the audio indicator 30 (the latter preferably including an audio amplifier and a speaker) as such flow conditions occur. The resulting visual and/or audio signals (in real time) alert the operator, irrespective of the fact that the operator's attention may be focused in another direction or on other duties.

Calibration of the transducer-meter 19 is required, and usually each meter 19 is provided with a separate calibration curve and temperature correction curve. In this regard, a particular adaptable transducer-meter 19, including useful calibration and correction curves, is manufactured by International Thermal Instrument Company, Del Mar, Calif., to the following specification:

| Temperature range | −425° F. to 550° F. |
|---|---|
| Material | Polyimide-glasses |
| Max Flux Density | $10^6$ BTU/Hr/Ft$^2$ |
| Time Constant | 1 Second (Approximately) |
| Output Resistance | 30 Ohms to 500 Ohms |
| Sizes | $\frac{1}{4}'' \times \frac{1}{4}''$ to $4'' \times 4''$ |
| Accuracies | 10% to 1% |
| Sensitivities | 7 to 250 BTU/Hr/Ft$^2$/Mv |

To provide a permanent record for operator perusal, the recorder 26 includes a mechanically driven stylus (not shown) which charts amplitude as a function of time on the graph 27, i.e., the recorder 26 records the ganged signal outputs from each associated transducer-meter 19, as a function of time. The latter is always electrically connected to the transducer-meter 19 via conductors 31. Centrally locating a plurality of recorders 26 and/or signaling circuits 28 to a multiplicity of improved transducer-meter 19 allows a single operator (at the central location) to monitor flow conditions of several relief flowlines simultaneously.

Figure 7:
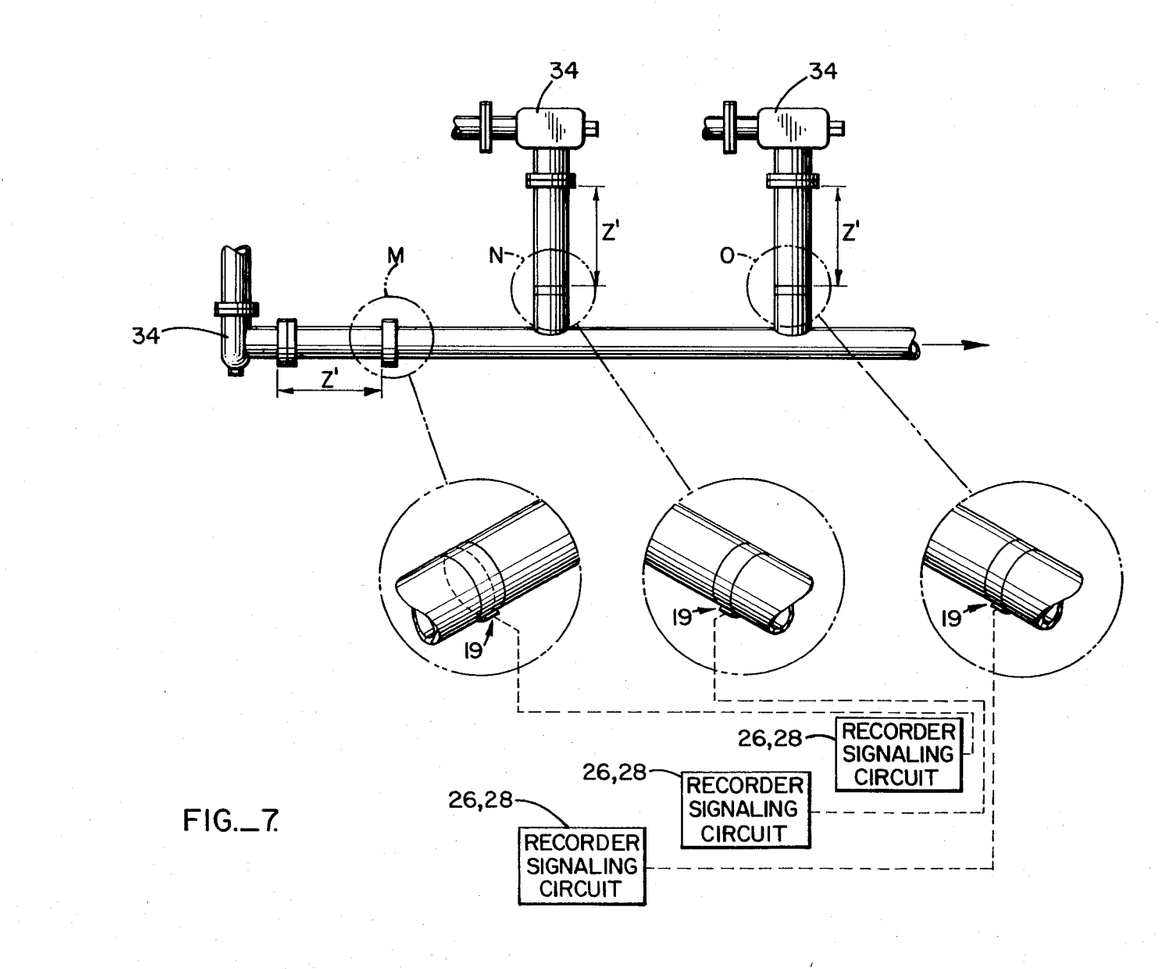
FIG. 7 is a partial view of a portion of the relief flowlines of FIG. 1, partially enlarged whereby a series of relief valves individually depicted in FIG. 2 can be better illustrated in positions adjacent to a plurality of transducer-meters of the present invention, the latter being electrically connected, in turn, with a like-number of recorders and signaling circuits for the purpose of monitoring the flowlines.

FIG. 7 shows such a plurality of recorders 26 and signaling circuits 28 for the purpose of monitoring flow conditions in several of the relief flowlines depicted in FIG. 1, viz., via transducer-meters 19 placed at positions M, N, and O within the refinery complex 12, and electrically connected to such recorders 26 and signaling circuits 28. Note in this regard that the positions M, N, and O of the meters 19 are depicted as being at distances Z' from the individual relief valves 34, depending upon temperature conditions along the flowlines determined as explained hereinafter.

In FIG. 2, the flowline 13 is seen to be elevated above ground surface 32 via pipe support 33. Also supported are the following: a relief valve 34, a flanged joint 35 formed between the valve 34 and the flowline, a shielding bonnet 36 placed about the meter 19, as well as a conduit 37 into which the conductors 31 (connecting the meter 19 with the recorder 26) are located.

When the pressure at the interior at the relief valve 34 exceeds its set-point level, flow occurs. That is to say, forces acting on a spring-loaded internal valve rod (not shown) are overcome by the interior fluid pressure, causing movement of the former so as to open the valve orifice to flow. Changes in set-point level are also easily achieved via controlled rotation of capping nut 43 located on the exterior of the relief valve 34, as shown in FIG. 2.

Since prior to such flow the temperature of the flowline 13 in the vicinity of meter 19 and the surrounding air are substantially the same, the meter provides a base line signal level 54 at the recorder 26 (see FIGS. 2 and 5) that is essentially constant with time. Such temperature condition is termed a "steady state" condition in this application.

In establishing the prime location of the meter 19 relative to the relief valve 34 (i.e., establishing the Z distance on the downstream side of flow), the nature of the existing temperature gradient surrounding the valve 34 is important.

Where liquids are blocked by the valve, the temperature gradient at the axis of symmetry of the flowline 13 has been found to decrease as a function of distance along the line at a constant slope until the latter becomes essentially equal to the temperature of the surrounding air, i.e., reaches the steady state ambient temperature of the system. In such case, the meter 19 can be located at such point of intersection provided. The latter is not positioned so far from the valve 34 that in the flow condition, the transient operating mode ends before detection of the fluid by the meter 19 can occur. That is to say, if the heat flow in the flowline 13 due to flow, changes from a transient to a steady state condition, the meter 19 cannot detect such condition with regularity.

Where a gas phase is upstream of the valve, the temperature gradient in the vicinity of interest has been found to decrease more steeply as a function of distance along the line, and becomes essentially equal to that of the surrounding air in a relatively short horizontal distance measured from the axis of symmetry, CL of the valve 34. In such case, the meter 19 is usually located closely adjacent to the vertical plane through flanged end 35 of the valve 34. In that way, as flow occurs, the transient heat flux is assured of being sensed before the flowline 13 and the surrounding air again reach a steady state temperature condition.

Figure 5:
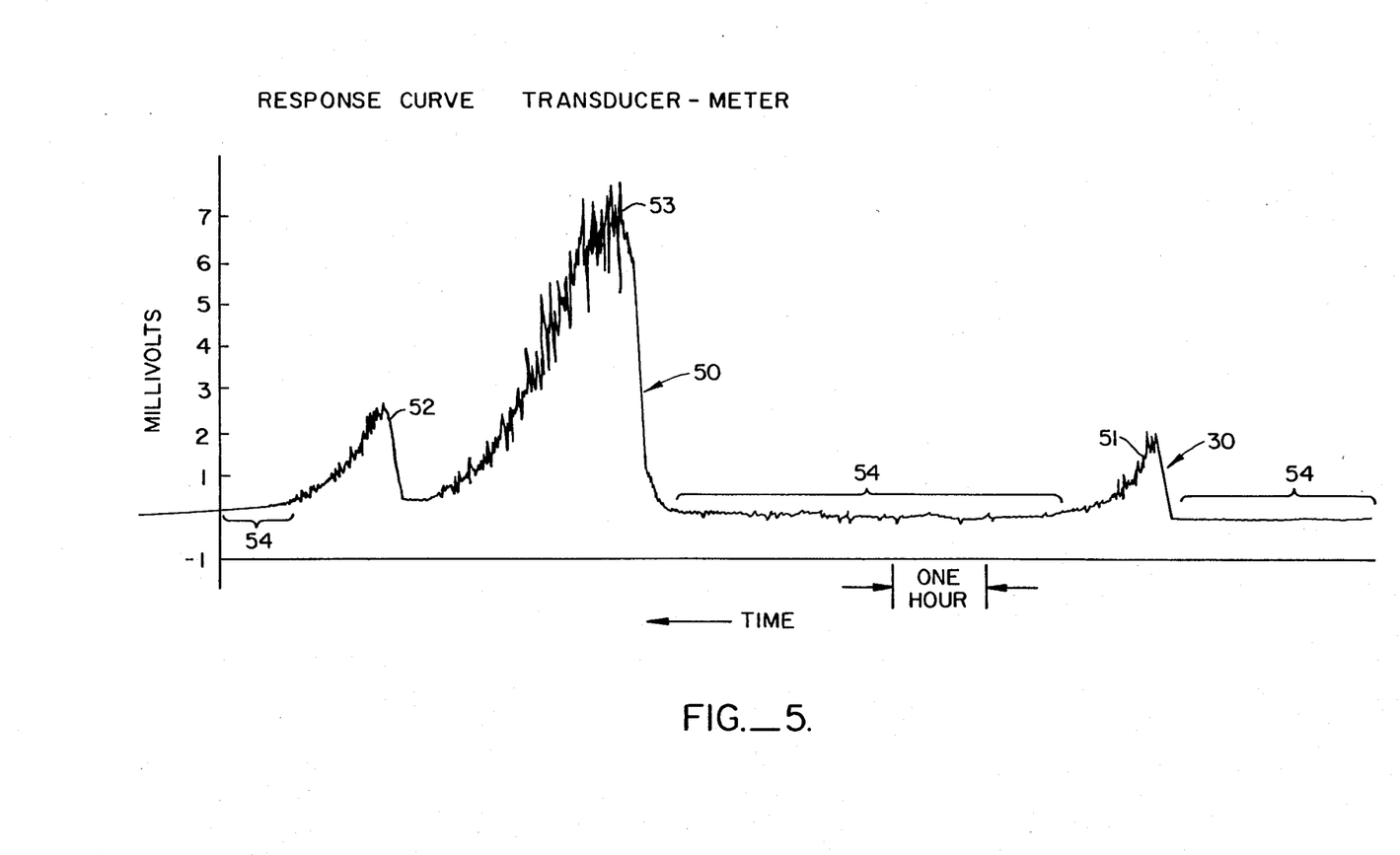
FIG. 5 is an actual plot of the signal output of an individual transducer-meter of FIG. 1, versus time.

Hence, where liquids, gases or a combination are being blocked by the valve 34, the ideal location for the meter 19 under these circumstances would be a distance Z from the line of symmetry, CL, whereby the following conditions can be met: (i) in the no-flow condition, heat conduction at the meter 19 is minimal, but (ii) in the flow condition, a transient detection state becomes established. That is to say, the distance Z varies with the fluid type to be monitored as well as the temperature gradient existing at the axis of symmetry of the flowline in the vicinity of its flanged joint, with the ultimate aim in the monitoring state being to provide a transient condition at the meter 19 as flow actually occurs, i.e., establishes peaks 51, 52 or 53 on graph 30 as shown in FIG. 5.

In that way, the resulting change in signal level associated with a flow condition is more easily identified since the detected flux level is related specifically to a transient thermal detection mode only. Relative change is also more easily ascertainable for the same reason.

Note also that the radial position of the meter 19 relative to the axis of symmetry of the line has also been carefully selected to again maximize response during operations.

That is to say, the meter 19 is radially disposed at the underside of the flowline closest to the ground surface 32. In that way, the former is always juxtapositioned to minimum liquid flow levels interior of the flowline 13.

Figure 6:
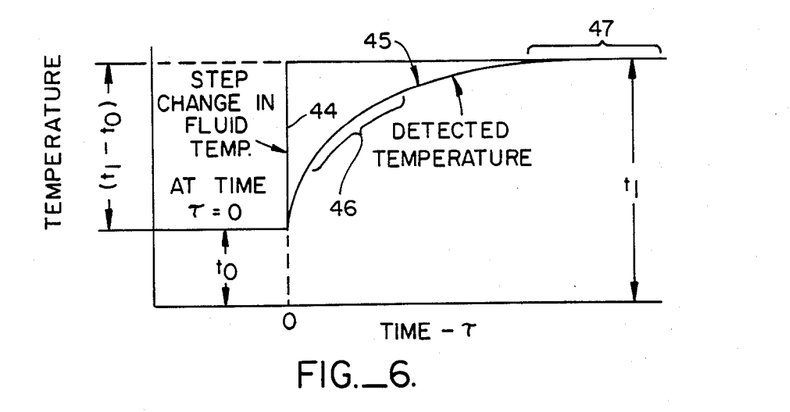
FIG. 6 illustrates the transient character of the output of the transducer-meter of the present invention.

FIG. 6 illustrates, in more detail, transient and steady state conditions vis-a-vis operations of the transducer-meter 19 of the present invention.

As shown, assume that the temperature conditions of the upstream fluid and that of the flowline 13 and the surrounding air (in the vicinity of the meter) are initially "steady state", viz., are essentially constant at the air temperature and are constant with time. That is to say, the fluid temperature is constant with time over region 42 of curve 45 (in FIG. 6), while that of the flowline and surrounding air is less than that although constant with time, say equal to the baseline temperature provided via base line signal 54 at the recorder 26 in FIGS. 2 and 5.

During flow, the temperature of the fluid undergoes a step change 44 as shown, while the temperature existing at the boundary of the flowline 13 (due to optimal location in accordance with the present invention) undergoes a slower change in a transient knee section 46 of curve 45 (in FIG. 6).

Note that since in most applications the periodicity of the fluid flow is irregular, the length of time of fluid flow in unpredictable, and there are variables external to the flowline 13 itself, operations within the knee 46 of the curve 45 are a common occurrence. That is to say, the transducer-meter 19 operates in a transient mode in the present invention. But if the system operates within region 47 of the curve 45 during detection, such operations would be termed "steady state" and would not be as efficient at indicating the occurrence of flow conditions within the flowline 13 as when the invention is operated in a transient mode. Reason: Under steady state conditions, the temperature differential can decrease due to the fact that the heat capacity of the fluid is usually so much less than that of the flowline 13 on a normalized basis. Result: Under many detection situations, only a slight rise in overall skin temperature of the line 13 would occur if detection operations were carried out under steady state conditions.

FIGS. 3 and 4 illustrate bonnet 36 in more detail.

As shown in FIG. 3, bonnet 36 is cylindrical and includes a sidewall 36a forming a cavity 36b open at endwall 36c but closed at its opposite end in contact with the relief line 13. Strap 38, circumferentially stretching about the relief line 13, semipermanently supports the bonnet 36 relative to the line 13.

Since it is desirable to have a large thermal resistance at its contact surface with the line 13, boundary 36d of the bonnet 36 can be gnarled to increase the number of air spaces in the plane of the endwall.

To avoid further thermal interference with each transducer-meter 19 of the present invention, the bonnet 36 is also centered about the former (but avoids direct metal-to-metal contact therewith) by having a somewhat annular air space 36e therebetween, see FIG. 4. Sidewall 36a of the bonnet 36 is also provided with openings 39 through which the electrical conductors 31 extend, see FIG. 4. These electrically connect each transducer-meter 19 with its associated recorder and/or signaling circuits as previously discussed.

The size of the openings 39 can be enlarged to fit snugly about the conductors 31 as desired. In that way, rain, moisture or other environmental factors can be somewhat inhibited from directly contacting each transducer-meter 19 of the present invention, during operations thereof. Hence, the latter's operations remain stable once calibration has occurred and its background signal level correspondingly remains at a minimum level.

Note also that the conductors 31 can include a receptacle 40 (FIG. 2) so as to allow easy relocation of the bonnet-transducer assembly from place to place along the line 13, as required. At the other end of the receptacle 40 is the ultimate destination of the conductors 31: the system recorder and/or signaling circuits previously mentioned.

In order to further minimize background noise level, each transducer-meter 19 of the present invention must be firmly attached to the line 13. In this regard, a conventional heat conductor adhesive 41 (see FIG. 3) having a high conductivity value such as between 15–20 BTUs/per hour/per square foot/per degree F./per square inch of thickness can be used. In this regard, an adhesive manufactured by Dow Corning under the trade name "DC #340" has proven adequate in all applications.

Although the invention has been described in terms of specific embodiments set forth in detail, it should be understood that such description is by way of illustration only and the invention is not necessarily limited thereto since alternatives will be readily apparent to those skilled in the art, but rather by the scope of the following claims.

What is claimed is:

1. Method of providing detection of fluid flow in a series of relief flowlines of a relief-flare system through activation of associated relief valves controlling discharge from process units of a chemical or refinery complex whereby sources of relief discharge therein can be pinpointed, comprising:
    (a) positioning at least one of a series of transducer-meters for sensing heat flux in a selected location that is (i) radially disposed exterior to at least one of said flowlines in heat conducting contact therewith while maintaining integrity of said at least one flowline radially intact and (ii) linearly disposed along said one flowline closely adjacent to an associated relief valve so that fluid discharge through said relief valve can be accurately detected by said transducer-meter;
    (b) for said one of said series of meters, continuously recording a base line signal constant with time but above a predetermined threshold level, said base line signal being indicative of a no-flow, steady state temperature condition within said at least one flowline at said selected location; and
    (c) monitoring change in fluid flow interior of said one flowline at said selected location by generating and recording a transient cascaded output signal proportional to transient heat flux detected exterior of said one flowline, said recorded transient signal deviating in amplitude from said prior recorded base line signal whereby said change in fluid flow can be accurately indicated thereby indicating the occurrence of said transient cascaded signal output so as to pinpoint location of relief discharge from one or more associated process units of said chemical or refinery complex.

2. Method of claim 1 in which said step of positioning said at least one of said series of transducer-meters includes placing a multiplicity of said transducer-meters in sufficient numbers and at selected locations linearly disposed adjacent to associated relief valves of said relief-flare system so as to provide a series of: (i) base line signal levels each indicative of a no-flow condition at each associated relief flowline and selected location along said flowline; and (ii) transient cascaded output signals each proportional to transient heat flux indicative of a flow condition at said selected location whereby sources of relief discharge can be easily isolated from other sources of discharge.

3. Method of claim 1 in which the substep of linearly disposing said at least one transducer-meter along said one flowline in a selected location adjacent to said associated relief valve is characterized by determining said location based on (i) type of temperature gradient existing at the axis of symmetry of said one flowline in the vicinity of a joint between said relief valve and said one flowline, in a no-flow condition, and (ii) fluid type to be monitored.

4. Method of claim 3 in which said fluid to be monitored is a gas and said substep of linearly disposing said at least one transducer-meter is characterized by placing said meter closely adjacent to a plane passing through a flanged end of said relief valve along said one flowline wherein temperature at said selected location is equal to that of ambient air exterior of said flowline, in a no-flow condition.

5. Method of claim 3 in which the fluid to be monitored is a liquid and the substep of linearly disposing said at least one transducer-meter along said one flowline adjacent to said associated relief valve is characterized by placing said meter a distance that is measured from the line of symmetry of said relief valve to said selected location that is beyond said flanged end of said relief valve with said one flowline wherein temperature at said selected location is equal to that of the ambient air exterior of said flowline, in a no-flow condition.

6. Method of claim 3 in which the substep of linearly disposing said transducer-meter along said one flowline includes surrounding said heat flux sensing transducer-meter with a weathering bonnet attached in substantially non-heat conducting contact with said at least one flowline, and having a cavity enclosing, to a substantial degree, said transducer-meter so as to increase base line and transient signal response of the latter.

7. A method of detecting flow in any branch of a conduit system having a plurality of branches that may be contributing flow to said conduit system through operation of a series of associated control valves, comprising:

positioning a thermopile in at least one branch of said system at a selected location closely adjacent an associated control valve measured downstream a distance from the axis of symmetry of the control valve;

recording a base line signal of each of said thermopiles when no fluid is flowing through said one branch of said system; and detecting changes in the fluid flow as discharge through said associated output valve in said one branch occurs by measuring the transient signal generated by the thermopile proportional to transient heat flux at said selected location exterior of said one branch contributing flow to said conduit system, said recorded transient signal deviating in amplitude from said prior recorded base line signal whereby variations in fluid flow can be easily identified.

* * * * *